United States Patent

[11] 3,545,702

[72] Inventors Andre Henri Laville
Enghien-Les-Bains;
Francis Henri Marie Joseph Maillard,
Courbevoie, France
[21] Appl. No. 700,904
[22] Filed Jan. 26, 1968
[45] Patented Dec. 8, 1970
[73] Assignee Sud-Aviation Societe Nationale de
Constructions Aeronautiques
Paris, France
[32] Priority Feb. 10, 1967
[33] France
[31] No. 94,446

[54] CONTROL SYSTEM FOR A HYBRID HELICOPTER-AUTOGYRO OF THE JET LIFT AND PROPULSION TYPE, AND CONTROLS THEREFOR
11 Claims, 9 Drawing Figs.

[52] U.S. Cl. ..................................................... 244/17.19,
416/98
[51] Int. Cl. ....................................................... B64c 27/72,
B64c 27/74, B64c 27/76

[50] Field of Search .......................................... 244/17.11,
17.19, 7, 6; 170/135.2, 135.74, 160.25; 74/480,
469; 60/(Inquired); 416/98

[56] References Cited
UNITED STATES PATENTS

| | | | |
|---|---|---|---|
| 2,865,171 | 12/1958 | Gaubatz ........................ | 170/135.74X |
| 2,945,347 | 7/1960 | Colley .......................... | 170/135.74X |
| 2,961,052 | 11/1960 | Smith et al. ................... | 170/135.74 |
| 3,073,328 | 1/1963 | Chillson et al. ............... | 170/135.74X |

*Primary Examiner*—Milton Buchler
*Assistant Examiner*—Paul E. Sauberer
*Attorney*—Waters, Roditi, Schwartz & Nissen

ABSTRACT: A control system for a hybrid helicopter-autogyro, in which a single lever-type control permits flight control in the helicopter and autogyro modes, transitions therebetween, and deceleration, which single control is adapted to be capable of describing two paths of motion, of which one lies in the pivotal plane of the lever and the other is substantially helicoid.

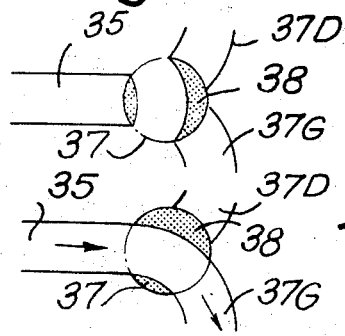
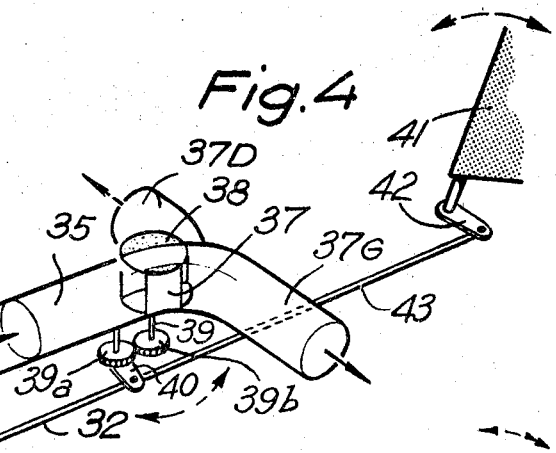
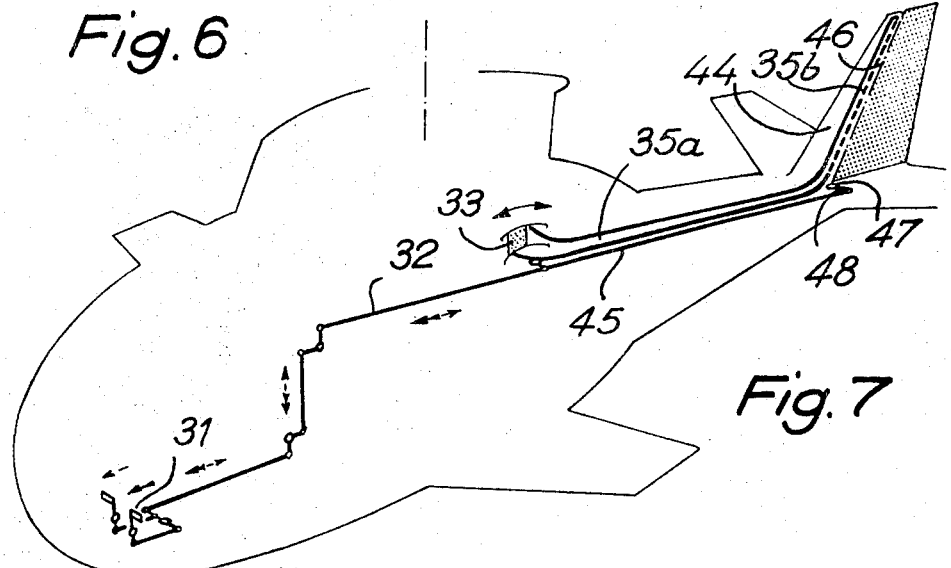
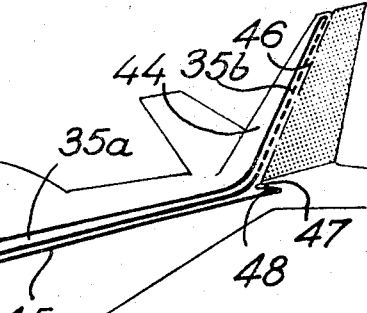
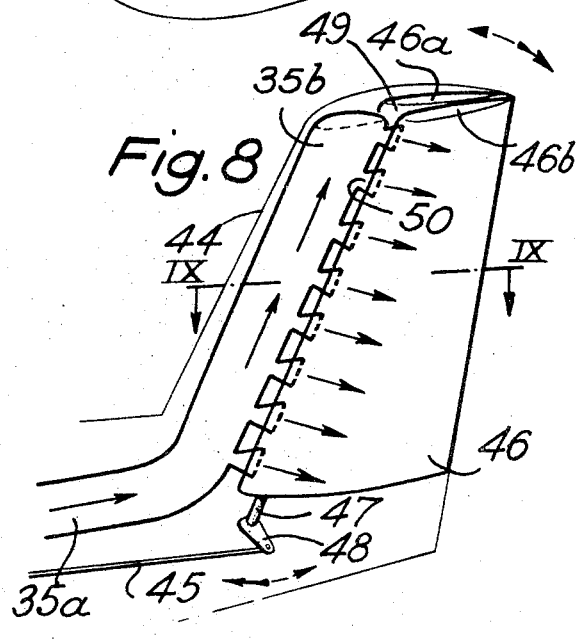
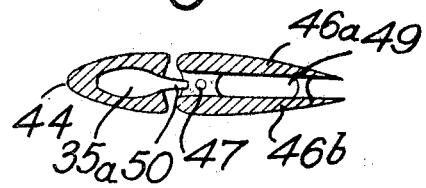

3,545,702

CONTROL SYSTEM FOR A HYBRID HELICOPTER-AUTOGYRO OF THE JET LIFT AND PROPULSION TYPE, AND CONTROLS THEREFOR

This invention relates to a control system for an aircraft of the hybrid helicopter-autogyro type embodying a lift and propulsion system of the kind described in U.S. Pat. application Ser. No. 687,262 filed Dec. 1, 1967 under the title "Lift and Propulsion Device for a Jet Aircraft of the Hybrid Helicopter-Autogyro Type".

The purpose of such a control system is to allow the aircraft to fly in the helicopter mode or the autogyro mode, to perform transitions therebetween, or to decelerate, and to enable its yawing motions to be controlled.

The power required to perform these various functions is provided by compressed air available in a distribution chamber of the kind described in the aforesaid patent application, which compressed air is used either to drive at least one freely rotatable jet-driven rotary wing, or to propel the aircraft directly, or to do both at once, and also in order to decelerate the aircraft and control its yawing motions, the particular function or functions to be performed depending on the mode of flight.

The subject system of this invention for controlling flight in the helicopter mode, in the autogyro mode, during transitions therebetween, or for deceleration, includes a single lever-type control (hereinafter referred to as a "unicontrol") within reach of the pilot and capable of being moved along two different paths determined by a guide, of which one is a flat path in a plane perpendicular to the hinge axis of the lever and the other is substantially helicoid.

Through associated linkage means, the flat path controls the collective pitch of the lift rotor.

Through the agency of associated transmission means, the lever further controls during its helicoid movement opening and closure of flaps for directing and apportioning compressed air between means for rotating the helicopter rotor and propelling nozzles.

The unicontrol further comprises a movable member such as a twistgrip on said lever whereby to control the motive power for generating the compressed air, as for instance by metering the fuel intake to a compressor-driving gas turbine.

The unicontrol may include in addition a second movable member such as a button on the end of the lever for activating, through a servocontrol, cross-connected flaps which uncover compressed air retrojet discharge orifices.

In one specific form of embodiment said lever is associated to a grid-shaped guide slotted in the form of a lambda which has one of its arms lying in a plane perpendicular to the hinge axis of a subjacent sleeve carrying the lever and associated to an intermediate collective pitch control for the lift rotor, and a helicoid or substantially helicoid other arm opening out into the first-mentioned arm. The lever is pivotally mounted through a clevis and hinge pin on said sleeve and is connected, through a link which is itself swivel-jointed to a bellcrank lever, to the control means of apportionment of the air used for lift and propulsion.

Considering next the question of controlling next motion, recourse is had for the purpose to the compressed air issuing from said distribution chamber so as to generate a manoeuvering moment of the required magnitude and direction.

A first valve associated to the distribution chamber proportions the compressed air flowing into a duct extending up to the rear of the aircraft.

In a first constructional form, this duct divides into two nozzles which debouch at the rear of the fuselage, respectively on the right and left thereof, while a second valve positioned at the point of division of the duct controls the compressed air channeled into one or the other of these nozzles.

The two valves are controlled by a cross linkage extending up to a conventional rudder bar provided in the cockpit.

In an alternative embodiment, the second valve is connected through linkage means to a vertical control surface which deflects towards the side from which compressed air is being ejected.

In yet another constructional form, a single proportioning valve is cross-connected through its control means to a hollow vertical control surface consisting of two elements separated by an intermediate space and opening out respectively into the leading and trailing edges of said control surface, and this space is supplied by nozzles which debouch thereinto adjacent the hinge axis of the flap, these nozzles being in turn fed through a conduit extending from said proportioning valve.

In all the aforementioned embodiments, the interconnections between the control members (the lever and its ancillaries, and the rudder bar), and the corresponding controlled elements, may be either of the direct type using linkage means, or of the relayed type using servomotors of the pneumatic, hydraulic, electric or other convenient type, either in toto or in part only.

The description which follows with reference to the accompanying nonlimitative exemplary drawings will give a clear understanding of how the invention can be carried into practice.

BRIEF DESCRIPTION OF THE DRAWING

FIG. 4 is a diagrammatic perspective showing of a first embodiment of means for controlling yawing motion.

FIGS. 5 and 6 show similarly in plan view two different positions of the compressed air distributing rotary plug valve of FIG. 4.

FIG. 7 shows in perspective, in corresponding fashion to FIG. 3, an alternative embodiment of means for controlling yawing motion.

FIG. 8 shows correspondingly on an enlarged scale details of the control surface-forming flap and its compressed air feed system in the arrangement of FIG. 7.

FIG. 9 is a section taken through the line IX–IX in FIG. 8.

DETAILED DESCRIPTION

Figure 1:
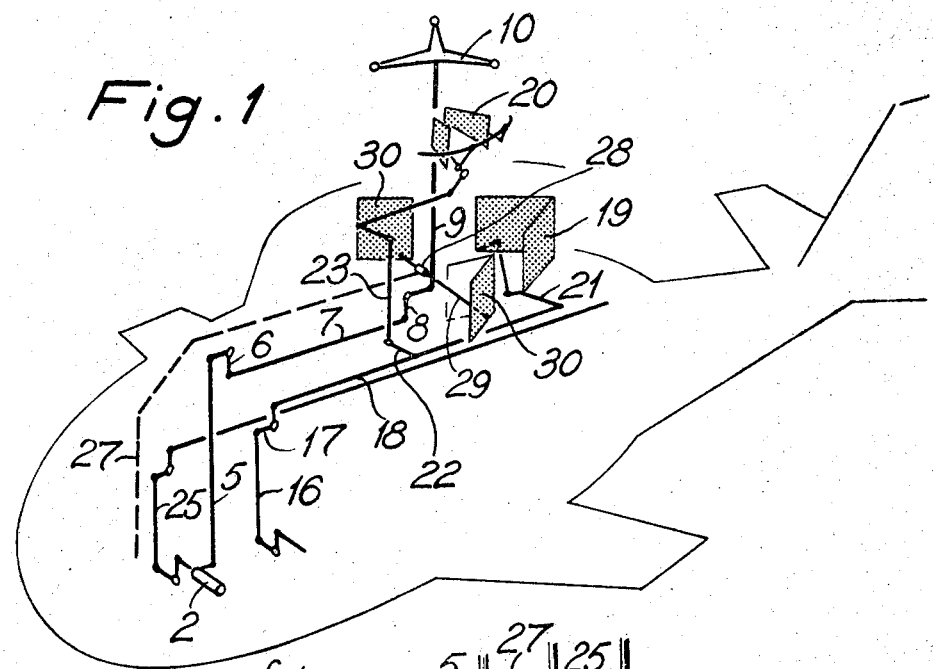
FIG. 1 shows in highly diagrammatic form and in perspective a hybrid helicopter-autogyro, portraying the different means used to equip the distribution chamber and the control functions performed by a single, multiple-function lever shown on an enlarged scale in FIG. 2.
Figure 2:
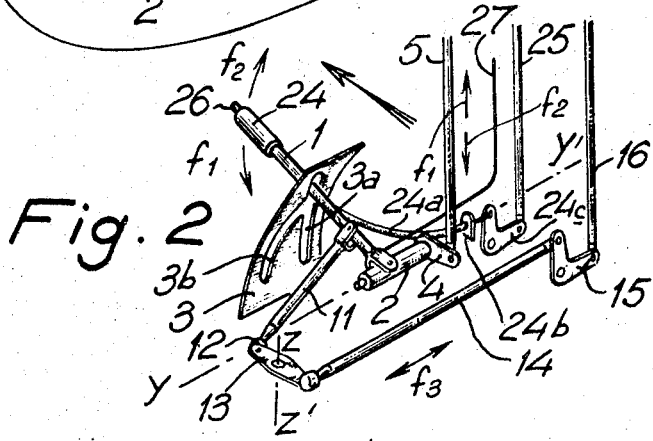
FIG. 2 is a corresponding detailed diagrammatic perspective showing of the unicontrol lever together with the primary elements 3a the different links corresponding to the various functions which the lever is capable of controlling.

Referring now to the form of embodiment portrayed for exemplary purposes in the accompanying drawings, FIG. 1 clearly shows the different flaps equipping the distribution chamber described in the aforecited U.S. Pat. Ser. No. 687,262, and the elements used to interconnect these different flaps and to connect them to a control element consisting of a single lever 1 shown in greater detail in FIG. 2. The lever 1 is mounted by means of a hinged clevis on a sleeve 2 which is rotatable about an axis Y–Y' preferably parallel to the pitch axis of the aircraft. Lever 1 extends through a guide 3 and is guided therein by means of a lambda-shaped guiding slot formed with an arm 3a lying in a plane perpendicular to the axis Y–Y' and an arm 3b set at an angle to the arm 3a opening out thereinto.

The sleeve 2 carries on one of its ends a lever 4 to which is pivotally connected a first rod 5 which, through a bellcrank 6, a rod 7 and a bell crank 8, transmits the motion of sleeve 2 to the shaft 9 carrying a star-piece 10 which determines the collective blade pitch of the lift rotor, the said blades not being shown.

A link 11 is connected to lever 1 through a clevis and a hinge pin. At its end remote from said clevis, link 11 is connected through a ball joint 12 to a rocker 13 pivoted about an axis Z–Z' perpendicular to the axis Y–Y', substantially along which latter axis the ball joint 12 moves. The rocker 13 has its other end pivotally connected to a rod 14 which is connected through a bell crank 15 to a further rod 16. Through a bell crank 17 and rod 18, the rod 16 actuates, firstly, the flaps 19 for adjusting the section of a propelling compressed air ejection nozzle via suitable linkage 21, and, secondly, flaps 20 for admitting air to the jet-driven lift rotor through the medium of an intermediate crank 22 pivotally connected to a suitable point on the rod 18, in conjunction with a shaft 23 rotated by said crank and actuating the linkage system associated to the flaps 20.

Mounted on unicontrol lever 1 is a twistgrip 24 for adjusting the fuel intake to a power plant (not shown) of the gas turbine type which drives an air compressor for supplying the aforesaid distribution chamber. The twistgrip 24 is mounted on the end of lever 1 and operates a sheathed control cable 24a, the outer sheath of which bears against a support 24b and the inner cable has its end attached to a bellcrank 24c to which is pivotally connected the first element 25 of a linkage system extending up to the engine fuel inlet control.

A button 26 protruding from the top of twistgrip 24 forms an electric switch which, through an electrical harness 27, activates an electrohydraulic or electropneumatic control 28 the output rams 29 of which operate reversing flaps 30.

The above-disclosed first section of the control system of this invention operates as follows:

During flight in the helicopter mode, the flaps 20 for admitting air to the lift rotor are open and the propulsion flaps 19 are closed, as shown in FIG. 1. Any movement of lever 1 along the slot 3a of guide 3 (see arrows $f_1$ and $f_2$ of FIG. 2) will affect only the rod 5, without altering the position of said flaps, and will operate solely on the collective pitch of the blades. This particular manoeuvre is consequently associated to flight in the helicopter mode (arrows $f_1$ and $f_2$).

To effect the transition from flight in the helicopter mode to flight in the autogyro mode, the pilot must simultaneously reduce the collective blade pitch of the lift rotor (by lowering lever 1 in the direction of the corresponding arrow $f_1$) and slip the lever 1 into the slanting guiding slot 3b. In addition to changing the collective pitch of the lift rotor, this manoeuvre causes rod 16 to be operated upon by rod 14 (arrows $f_3$). A downward movement along th slot 3b causes rod 11 to thrust away ball joint 12, and the resulting 3b, of rod 16, rod 18 and cranks 21 and 22 simultaneously causes gradual closure of flaps 20 and gradual opening of flaps 19. The proportion of compressed air admitted to the lift rotor is accordingly reduced, while the propulsive effect of the compressed air at the location of flaps 19 increases. The transition from flight in the helicopter mode to flight in the autogyro mode can then be effected, the process terminating when lever 1 is in its lowermost position in slot 3b, corresponding to full closure of flaps 20 and full opening of flaps 19.

It will readily be understood that a reverse upward movement of unicontrol 1 along slot 3b in the direction of slot 3a will produce the converse transition from flight in the autogyro mode to flight in the helicopter mode.

On the other hand, throughout the flight envelope in the helicopter mode, the unicontrol remains without effect on link 11 as it moves through slot 3a and therefore has no effect on the apportionment of air to the rotor (the flaps 20 remaining open) or on propulsion (the flaps 19 remaining closed).

The power output from the power plant will depend on the degree to which twistgrip 24 is rotated.

Operating the button 26 enables the flaps 30 to be opened or closed for the purpose of initiating or arresting a deceleration process. The advantage afforded by unicontrol lever 1 and its auxiliaries is that of permitting transition from flight in the helicopter mode to flight in the autogyro mode, and vice versa, without engendering any break in the piloting process, with the apportionment of compressed air between the lift system and the propulsion system taking place smoothly and progressively.

Figure 3:
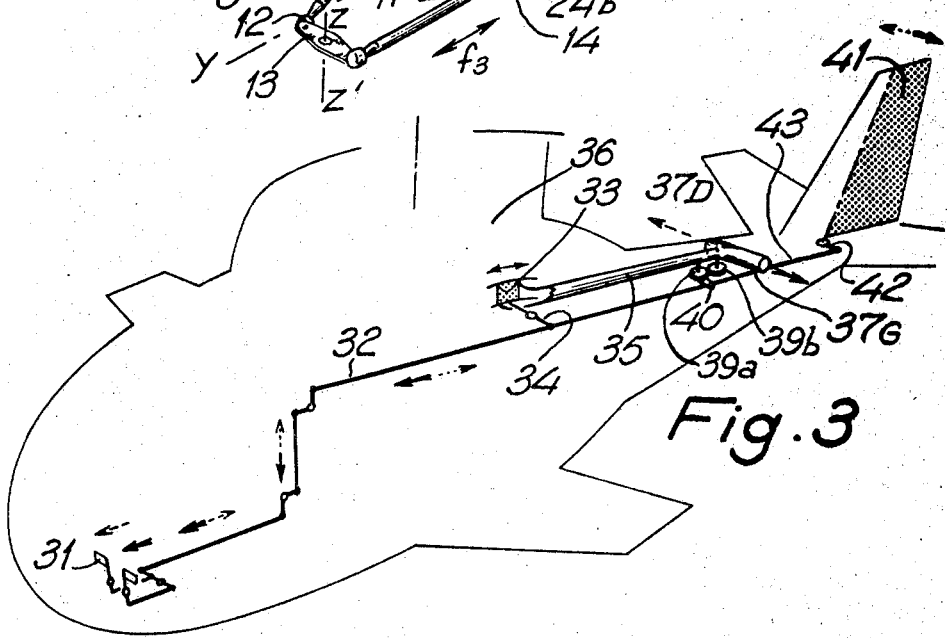
FIG. 3 shows in corresponding fashion to FIG. 1 the arrangement for controlling yawing motion.

As shown in FIG. 3, yawing motion is controlled by a rudder bar 31 provided in cockpit, and this rudder bar operates through linkage means 32 consisting of rods and bell cranks which actuate a valve 33 via a rocker 34. In its neutral position valve 33 covers (and in any other position uncovers to a varying extent) a duct 35 connected to an appropriate point on the lower or sidewall of the aforementioned distribution chamber 36 positioned at the top of the fuselage of the hybrid helicopter-autogyro. The outlet end of duct 35 has port in the housing 37 of a distribution valve plug 38, and this housing has two symmetrical outlets which supply two nozzles 37d and 37g positioned respectively to the right and left of the rear of the fuselage and ejecting in directions perpendicular to the fore-aft axis of the aircraft. The rotary plug 38 is rigid with a shaft 39 fixed to a pinion 39a meshing with a further pinion 39b having its shaft parallel to that of pinion 39a and which is rigid with a crank 40 actuated by the linkage 32.

A control surface 41 has a pivot rigid with an arm 42 which is connected through a rod 43 to the crank 40, and this control surface assists in controlling the aircraft about the yaw axis in forward flight. The compressed air used to control yawing motion of the aircraft represents only a small proportion of the output from the blower equipping the distribution chamber, namely about 4 percent of the total output.

The theory of operation of the above system is as follows:

As soon as the rudder bar 31 is moved away from its neutral position corresponding to zero yawing moments, valve flap 33 uncovers the inlet to duct 35. At the same time, rotary valve plug 38 is shifted from its sealing position (FIG. 5) into a partially open position (the fully open position being shown in FIG. 6), and the air admitted into duct 35 is ejected in quantities proportioned by the corresponding lateral nozzle 37G in FIGS. 4 and 6.

Control surface 41 is deflected in the corresponding direction, and the arrows in FIGS. 3 to 6 show the directions in which these actions take place, as well as the corresponding directions of flow.

In the alternative embodiment shown in FIGS. 7 to 9, a constructional simplification is obtained by dispensing with plug 38. As explained precedingly, the linkage system 32 accordingly operates a flow-metering valve 33, but the duct 35 a extends up to a distributor 35b disposed within a vertical fin 44 extended by a movable control surface 46 which is rigid with its pivot 47. The pivot is itself rigid with an arm 48 to which is connected an extension 45 of rod 32.

Control surface 46 consists of two 46a sections 46a and 46b interconnected by likewise streamlined spacers, and these two aerofoil sections leave a space 49 between their inner surfaces. Debouching into this space, adjacent the leading edges and over the entire span of control surface 46, are nozzles 50 supplied by the distributor 35b, and these nozzles discharge compressed air into the space 49 that escapes from the region of the trailing edges of aerofoil sections 46a and 46b.

The above system functions in similar fashion to that described with reference to FIGS. 3 to 6, and the compressed air expelled from the trailing edge of control surface 46 will generate a force whose magnitude and direction will vary with the degree of opening of valve 33 and the concerted deflection of control surface 46, thereby providing a variable control moment about the yaw axis.

Control about the roll and pitch axes during flight in the combined helicopter-autogyro mode is provided by conventional cyclic pitch control of the blades of the lift rotor, such control being well known per se and consequently requiring no further description and being consequently omitted from the drawings.

It goes without saying that many changes and substitutions of parts may be made to the specific forms of embodiments hereinbefore described without departing from the scope of the invention, as it is set forth in the appended claim.

We claim:

1. In a flight control system for a hybrid helicopter-autogyro employing jet lift and propulsion, a single-hinged control lever positioned within the pilot's reach for controlling flight in the helicopter mode using jet lift, in the autogyro mode using jet propulsion, during transitions therebetween and during deceleration, a guide member which determines two paths along which said lever can be moved, of which one lies in a plane perpendicular to the hinge axis of said lever and the other is a helicoid path, and transmission means mechanically connected to said lever for controlling flight.

2. In a system as claimed in claim 1, means connected to said transmission means for varying the collective pitch of the blades of the lift rotor.

3. In a system as claimed in claim 1, a rotatable sleeve coupled to said lever, a transverse link mechanically connected to said sleeve, said transverse link having one end constrained to move substantially along the rotation axis of said sleeve, means for rotating a lift rotor of the helicopter, at least one jet nozzle for propelling the helicopter-autogyro, said transmission means including a linkage means for ensuring concerted opening and closing of flaps for adjusting the direction and apportionment of compressed air between the means for rotating the lift rotor of the helicopter and at least one jet nozzle for propelling said hybrid helicopter-autogyro in forward flight.

4. In a system as claimed in claim 3, said guide member comprising a grid formed with a lambda-shaped slot through which said lever extends and which includes a first branch lying in a plane perpendicular to the rotation axis of said sleeve and a second branch set at an angle to said first branch and opening out therein, a hinged clevis mounting said lever on said sleeve, a further clevis for intermediate connection of the lever to said transverse link, a bellcrank connected to the other end of said link, and a rocker member connected to bellcrank and said linkage means.

5. In a system as claimed in claim 1, said lever including a first movable member in the form of a twistgrip and linkage means mechanically connected to said movable member for controlling the power output from a power plant of the hybrid helicopter-autogyro by regulating the fuel intake into a turbine driving an air compressor.

6. In a system as claimed in claim 1, said lever including a second movable member constituted as a button mounted on the end thereof and servocontrol means connected to the button for operating cross-connected flaps which uncover compressed air jet reversal orifices.

7. In a system as claimed in claim 1, control means for the yawing motion of said hybrid helicopter-autogyro, a distribution chamber for supplying compressed air to said control means, a distribution duct extending towards the rear of the fuselage and connected to said distribution chamber and a compressed air apportioning valve at the juncture of said chamber and duct and further transmission means connecting said valve to a rudder bar-type flight control.

8. In a system as claimed in claim 7, a duct terminating at its rear in two oppositely directed nozzles adapted to expel air jets in directions perpendicular to the longitudinal symmetry plane of the hybrid helicopter-autogyro, a rotary plug valve to channel the air into one or the other of said nozzles, and an arm rigidly connected to said plug and to the further transmission means between said rudder bar and said apportioning valve.

9. In a system as claimed in claim 8, an arm rigidly connected to the pivot of a rudder, said further transmission means being extended in the direction of the latter said arm.

10. In a system as claimed in claim 7, a duct, a distributor extending from said duct and having a plurality of nozzles opening into the internal void of a hollow control surface, said void being bounded by slot-shaped openings provided at the leading and trailing edges of said control surface, said nozzles being positioned along the span of said hollow control surface, which surface expels compressed air through said slot-shaped trailing edge opening and additional transmission means connecting said control surface to said rudder bar.

11. In a system as claimed in claim 1, wherein said transmission means is servo assisted.